United States Patent
Rudden et al.

(10) Patent No.: US 11,321,638 B2
(45) Date of Patent: May 3, 2022

(54) INTEROPERABLE SMART AI ENABLED EVALUATION OF MODELS

(71) Applicant: KYNDRYL, INC., New York, NY (US)

(72) Inventors: Mary Rudden, Denver, CO (US); Craig M. Trim, Ventura, CA (US); Shikhar Kwatra, Durham, NC (US); Stacey Heeley Ronaghan, Los Angeles, CA (US); William G. Dusch, Morrisville, NC (US)

(73) Assignee: Kyndryl, Inc., New York, NY (US)

( * ) Notice: Subject to any disclaimer, the term of this patent is extended or adjusted under 35 U.S.C. 154(b) by 178 days.

(21) Appl. No.: 16/819,445

(22) Filed: Mar. 16, 2020

(65) Prior Publication Data

US 2021/0287133 A1 Sep. 16, 2021

(51) Int. Cl.
*G06F 9/451* (2018.01)
*G06N 20/00* (2019.01)

(52) U.S. Cl.
CPC ............ *G06N 20/00* (2019.01); *G06F 9/451* (2018.02)

(58) Field of Classification Search
CPC ................................ G06N 20/00; G06F 9/451
See application file for complete search history.

(56) References Cited

U.S. PATENT DOCUMENTS

| 7,236,964 B2 | 6/2007 | Labreuche |
| 8,078,524 B2 | 12/2011 | Crawford et al. |
| 2014/0089824 A1* | 3/2014 | George ................. G06F 9/4451 715/762 |
| 2018/0285770 A1 | 10/2018 | Manikonda et al. |
| 2018/0293498 A1 | 10/2018 | Campos et al. |
| 2018/0322406 A1 | 11/2018 | Merrill et al. |
| 2019/0303404 A1 | 10/2019 | Amer et al. |
| 2020/0379609 A1* | 12/2020 | Jacob ....................... G06F 8/24 |

FOREIGN PATENT DOCUMENTS

| CN | 107329770 A | 11/2017 |
| CN | 109118861 A | 1/2019 |
| CN | 109325581 A | 2/2019 |
| WO | 2014184381 A2 | 11/2014 |

OTHER PUBLICATIONS

Becker, "Why Model Explainability is The Next Data Science Superpower," Towards Data Science, Mar. 7, 2019, 3 pages, https://towardsdatascience.com/why-model-explainability-is-the-next-data-science-superpower-b11b6102a5e0.

"Algorithm Explorer," Printed Jan. 29, 2020, 1 page, https://samrose3.github.io/algorithm-explorer/.

(Continued)

*Primary Examiner* — Andrey Belousov
(74) *Attorney, Agent, or Firm* — Schmeiser, Olsen & Watts, LLP; Erik Swanson

(57) ABSTRACT

A machine learning model can be depicted as a graph. After identifying a familiarity level of a user, the graph of the machine learning model can be customized. The customization is based on the familiarity level of the user. The customized graph of the machine learning model is displayed to the user.

20 Claims, 8 Drawing Sheets

(56) References Cited

OTHER PUBLICATIONS

Gall, "Machine Learning Explainability vs Interpretability: Two concepts that could help restore trust in AI," KDnuggets, 2018, 6 pages, https://www.kdnuggets.com/2018/12/machine-learning-explainability-interpretability-ai.html.

"Lime: Explaining the predictions of any machine learning classifier," GitHub, Printed Jan. 29, 2020, 4 pages, https://github.com/marcotcr/lime.

Dhurandhar et al., "Model Agnostic Contrastive Explanations for Machine Learning Classification Models," IBM, Dec. 14, 2018, 14 pages, https://w3-connections.ibm.com/wikis/form/api/wiki/2d86c8a6-ffe9-4024-abaf-79cbf87aa4ed/page/06044537-d9bf-4ef4-8f13-d0afa3c9c474/attachment/98ae0366-7605-445f-8dd6-a6035a168087/media/Model_Agnostic_Contrastive_Explanations_for_Structured_Data-2.pdf.

"ELI5," Printed Jan. 29, 2020, 3 pages, © Copyright 2016-2017, Mikhail Korobov, Konstantin Lopuhin Revision 2497ec37, https://eli5.readthedocs.io/en/latest/overview.html.

"A game theoretic approach to explain the output of any machine learning model.," GitHub, Printed Jan. 29, 2020, 10 pages, https://github.com/slundberg/shap.

Mell et al., "The NIST Definition of Cloud Computing," Recommendations of the National Institute of Standards and Technology, U.S. Department of Commerce, Special Publication 800-145, Sep. 2011, 7 pages.

\* cited by examiner

INTEROPERABLE SMART AI ENABLED EVALUATION OF MODELS

BACKGROUND

The present disclosure relates to software, and more specifically, to assisting in user evaluation of different machine learning models.

Machine learning models ("ML models") have a wide variety of use cases. As a general overview, a ML model relies on one or more inputs, evaluates the input in view of one or more "hyperparameters," and outputs a result. Notably, ML models can evaluate their own performance, make adjustments, and reevaluate. This enables ML models to learn over time, ideally becoming increasingly accurate. ML models may initially undergo a "training" phase, iterating through the learning process while attempting to reach a known target output based on corresponding known inputs. A "hyperparameter" essentially refers to a functional practice of a ML model (such as, for example, a number of epochs used in training).

ML models can take a variety of forms, classified as different "types" of models. For example, a ML model may be of a "recurrent neural network" (RNN), "convolutional neural network" (CNN), Bayesian classifier, etc. In general, different ML models function differently, with different advantages and disadvantages depending upon a variety of factors. For example, an RNN may generally be considered more appropriate for use in signal analysis, while an RNN may perform poorly if used for video analysis (meaning it may either not be accurate enough or may require disproportionate training and/or resources in order to be accurate enough, in comparison to a better-suited type of ML model, such as a CNN).

Many users may utilize a dedicated tool to aid in selecting a ML model. Such a tool may, for example, generate, train and evaluate a number of different "candidate" ML models to present to the user as options, prompting the user to select one or more candidate ML models to implement. Some users may even select and implement multiple candidate ML models.

However, available tools may not provide users with sufficient information to enable the users to select a ML model that best suits their needs. For example, while many tools may present the user with an overall "score" for each model (and, in some cases, may even select a "best" model for the user), the metrics used to determine that score may be misleading or unclear. The score may be based on a number of factors such as, for example, root mean square error (RMSE). However, factors such as RMSE may be misleading in terms of which of the candidate ML models would be a best choice for the intended implementation. If a user is tasked to choose from a plurality of candidate ML models, the user may simply select one having the best "score" regardless of other (possibly more significant/relevant) factors.

Many users refer to ML models as "black boxes," in the sense that they can make good predictions but one may struggle to understand the logic behind those predictions. This is compounded by a growing use of tools that automate the process of selecting an appropriate ML model for a given task; some users are often content to simply select the ML model that is labeled "most accurate" or even just "best" with little to no understanding as to why that label may apply. Further, over time, ML models may need to be maintained, adapting the ML model to changing circumstances (such as additional data sources, changing datastreams, etc.). Maintenance can be more difficult depending upon how complex the ML models are (complexity can be influenced by number of hyperparameters as well as their nature).

Modern ML selection tools lack the ability to customize the presentation of optional ML models based on a user's familiarity. They further lack the ability to determine the user's familiarity in the first place. As a result, users can struggle to properly evaluate a ML model or a selection of ML models, often leading to users making a suboptimal selection.

SUMMARY

Some embodiments of the present disclosure can be illustrated as a first method. The first method comprises receiving a machine learning model. The first method further comprises creating a graphical overview of the machine learning model. The first method further comprises determining a familiarity level of a user. The first method further comprises customizing the graphical overview based on the familiarity level. The first method further comprises displaying the graphical overview. This first method advantageously enables presenting an enhanced overview of a machine learning model to a user based on a familiarity level of the user, enabling the user to more quickly and effectively assess the machine learning model.

Some embodiments of the present disclosure can be illustrated as a second method. The second method comprises the first method as discussed above. The second method further comprises detecting a user input. The second method further comprises determining, based on the user input, that a graph clarification is implicated. The second method further includes updating the graphical overview based on the graph clarification. This second method advantageously enables presenting a further-enhanced overview of a machine learning model to the user by enabling the user to interact with the graph.

Some embodiments of the present disclosure can be illustrated as a third method. The third method comprises the first method. The third method further comprises determining that a storage device does not include a familiarity profile associated with the user. The third method further comprises creating a new familiarity profile associate with the user in response to determining that the storage device does not include a familiarity profile. The third method further comprises, as part of the creating of the new profile, prompting a user to input familiarity information. The third method further comprises, as an additional part of the creating of the new profile, receiving a response to the prompt. The third method further comprises, as an additional part of the creating of the new profile, determining an initial familiarity level based on the response. The third method further comprises, as an additional part of the creating of the new profile, storing the initial familiarity level in the new familiarity profile, where the creating includes prompting a user to input familiarity information. The third method's creating further includes storing the initial familiarity level in the new familiarity profile, where the determining the familiarity level of the user (as discussed above in reference to the first method) is based on the new familiarity profile. This third method advantageously enables presenting an enhanced overview of a machine learning model to a user by creating a familiarity profile based on information input by the user.

Some embodiments of the present disclosure can also be illustrated as a computer program product comprising a computer readable storage medium having program instructions embodied therewith, the program instructions executable by a computer to cause the computer to perform any of the methods discussed above. This advantageously enables presenting an enhanced overview of a machine learning model to a user, enabling the user to more quickly and effectively assess the machine learning model.

Some embodiments of the present disclosure can be illustrated as a system. The system may comprise memory and a central processing unit (sometimes referred to herein as a "CPU"). The CPU may be configured to perform any of the methods discussed above. This advantageously enables presenting an enhanced overview of a machine learning model to a user, enabling the user to more quickly and effectively assess the machine learning model.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure. Features and advantages of various embodiments of the claimed subject matter will become apparent as the following Detailed Description proceeds, and upon reference to the drawings, in which like numerals indicate like parts, and in which:

Figure 1:
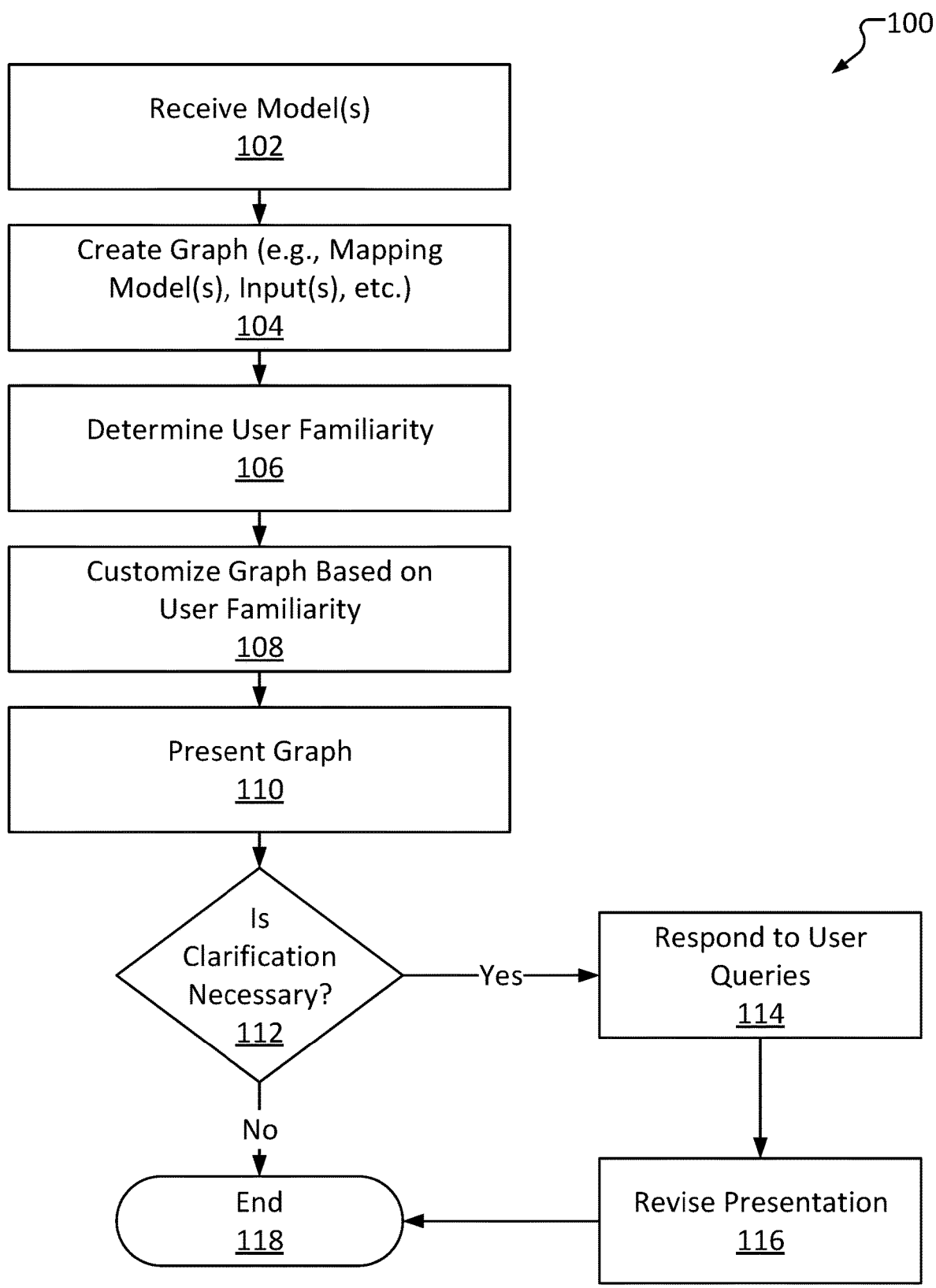
FIG. 1 illustrates an assisted machine learning model evaluation method consistent with several embodiments of the present disclosure.

While embodiments of the present disclosure are amenable to various modifications and alternative forms, specific embodiments have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DETAILED DESCRIPTION

Aspects of the present disclosure relate to a system and method to present evaluations of machine learning models based on user familiarity. More particular aspects relate to a system to determine a familiarity level of a user, generate a graphical evaluation of machine learning models, present the graphical evaluation based on the familiarity level of the user, monitor user interactions, respond to queries, and revise the familiarity level of the user based on the interactions on queries.

Throughout this disclosure, reference is made to "familiarity," "familiarity level," "familiarity score," and "familiarity profiles" in the context of a user. As used herein, a user's "familiarity" refers to a level of the user's technical knowledge of a relevant technology (such as machine learning models). Familiarity may be represented as a numerical value (a familiarity "score" or "level" such as, for example, a value between 0 and 1). A user's familiarity may be tracked in a familiarity profile. As used herein, a familiarity profile refers to a database tracking one or more familiarity levels and/or scores of a user.

Throughout this disclosure, reference is made to "machine learning models" ("ML models" or simply "models" for brevity). As used herein, a "machine learning model" may refer to one of a plurality of computer-implemented systems to perform various tasks, such as predicting an output based on one or more inputs and one or more hyperparameters. ML models may be categorized or organized into various "types." For example, ML model types may include artificial neural networks (ANNs), support vector machines (SVMs), Bayesian networks, etc. Even within the same type, different ML models may still vary widely in terms of accuracy, flexibility, complexity, training time, computational cost, format, etc.

ML models may be utilized in a wide variety of applications. Different types of ML models may generally be more effective for some applications in comparison to others; for example, SVMs may be considered more effective for non-linear classification, while ANNs may be more effective for speech recognition. However, as mentioned, even within the same "type," different ML models may have different characteristics that may make them more or less attractive for a given implementation. Combining this with a generalized lack of knowledge of various ML models, a user charged with selecting a specific ML model to implement for a given task may make a suboptimal selection. This may be due to user frustration or simply a lack of knowledge.

Systems and methods consistent with the present disclosure enable a user to evaluate one or more different machine learning models based on feedback tailored to the user's familiarity with the models. For example, a system may generate and display a graphical overview of a number of candidate ML models, providing the user with an "at-a-glance" view of how each model performs and operates (including, for example, a type of the model, a score based on the model's performance, which hyperparameters the model utilizes, as well as a description of each of the above). The system may further provide the user with an interactive interface, such as a chat bot, enabling the user to submit queries and otherwise explore the candidate ML models and their traits in additional detail.

The detail(s) provided to a user may be based on the user's familiarity with one or more topics. For example, a system may determine that a user is a "beginner" (implying that the user his minimal knowledge of, for example, machine learning), and, based on this determination, present the user with a high-level, generalized explanation of a particular candidate ML model (such as describing the type of model, listing common applications, listing applications the model may be a poor choice for, etc.). On the other hand, if the user is identified as an "expert," different descriptions may be presented. For example, in some embodiments, an "expert" user may be presented with additional detail (such as, for example, a subtype of the model, various industry acronyms and terms, etc.).

The system may further enable a user to query for additional information. For example, in some embodiments a description may include additional links or sections of expandable text to enable the user to acquire additional information as desired. In some embodiments, the user may be presented with a smart interface, enabling the user to submit natural-language queries (e.g., "which model utilizes the fewest hyperparameters?") and responding to the queries automatically in an intelligent manner. Specifics of this intelligent interface are described in further detail below, particularly in reference to FIG. 4.

Further, as the user interacts with the graphical display and/or interface, the system may reevaluate, revise, or otherwise refine a familiarity profile associated with the user. For example, if a user is initially determined to be an "expert" but proceeds to ask relatively beginner-level questions (e.g., "what does SVM stand for?", etc.) and/or clicks on links offering to explain simpler topics, the system may adjust the user's familiarity to treat the user as "intermediate" instead of expert. This may be tracked in a familiarity profile associated with the user. In a similar fashion, if the user asks more informed questions (e.g., "is the training dataset for this SVM linearly separable?"), the system may increase a familiarity rating.

The familiarity profile may have a changing "granularity" or "resolution" over time. In other words, a system may develop a more nuanced and/or complex profile of a user's familiarity with various topics as the system learns about the user over time. For example, an initial familiarity profile may simply identify the user as a "beginner." However, if the user repeatedly asks informed questions about a specific topic but not about others, the system may identify that the user is "intermediate" or "advanced" on the specific topic, but still a "beginner" on the other topics. For example, if a user demonstrates strong familiarity with Bayesian networks but asks simple questions about neural networks (NNs) and SVMs, the user may be considered an expert regarding Bayesian networks but a beginner regarding NNs and SVMs. Accordingly, the system may present additional detail about Bayesian network models but present only simplified explanations for NNs and SVMs.

In some embodiments, a higher familiarity may result in less detail being initially presented to the user; for example, a ML expert may be considered capable of digesting a graphical overview without text "cluttering" the view explaining things the expert already knows. Further, the expert may be capable of knowing what questions to ask, and may thus prefer a "cleaner" overview. On the other hand, a more intermediate user may be presented with additional prompts to choose from to account for a possibility that the intermediate user forgets to consider or inquire about specific details. However, in some embodiments, a lower familiarity may result in less detail being initially presented to the user, for example to avoid "overwhelming" or "intimidating" the user.

FIG. 1 illustrates an assisted machine learning model evaluation method 100 consistent with several embodiments of the present disclosure. Method 100 may be performed by, for example, a computing system (such as system 700 of FIG. 7). Method 100 includes receiving one or more candidate machine learning models at operation 102. The models may be received as a "package" including information such as scores, inputs, etc., as will be described in further detail below. The models may be input to a system performing method 100 by, for example, a user or may be received directly from a different system. For example, in some embodiments operation 102 may include receiving models generated from a separate ML model selection tool. In some embodiments, a system performing method 100 may be integrated into a ML model selection tool or communicably coupled thereto, such that an output of the ML model selection tool may be received directly at the system. In some embodiments, the candidate models may be generated (by the system performing method 100, as would be understood by one of ordinary skill in the art) instead of received.

Method 100 further includes creating a graph at operation 104. Operation 104 may include determining "traits" of each candidate ML model. "Traits" may include, for example, input(s), a target output, a type/subtype(s), a score (and type of score), hyperparameters used by the model, etc. These traits may be received as part of operation 102. The inputs may include a type or label of data "fed" into the candidate ML model, wherein an output may be based at least partially on the inputs. The target output may include a known value utilized to train the model. The type of model describes whether the model is, for example, a neural network, SVM, Bayesian network, etc., while subtypes refer to more specific categorizations of machine learning models within the respective type. For example, subtypes of artificial neural networks include convolutional neural networks (CNNs), recurrent neural networks (RNNs), recursive neural networks, etc. As described above, the score may be a metric used to represent a generalized accuracy of the model. There are several possible types of score, such as, for example, mean absolute error (MAE), RMSE, F1 score, Area under Precision-Recall, etc. Most machine learning models use one or more hyperparameters, which may have a significant impact on a ML model's fit or learning.

Operation 104 may further include mapping the field of candidate ML models. For example, in some embodiments, operation 104 may include generating a database to associate each model, input, target output, score, and hyperparameter with their own identifiers ("keys"), and tracking, for each model, which of the inputs the model uses, the target output the model was trained on, the model's score, and which (if any) hyperparameters the model utilizes.

Method 100 further includes determining a familiarity level of a user at operation 106. In general, operation 106 includes prompting a user to input familiarity information. Familiarity information, as used herein, refers to inputs from a user that aid in initializing a familiarity level, such as a user's self-assessment, responses to quiz questions, etc. For example, in some embodiments, operation 106 may include prompting a user to answer one or more predetermined questions about topics associated with machine learning. For example, operation 106 may include providing a "quiz" for the user to complete and assigning a familiarity level based on the user's responses (and/or time taken to complete). In some embodiments, operation 106 may include prompting a user to input the user's familiarity level, possibly providing general descriptions and examples to guide the user's response. For example, operation 106 may include displaying a prompt including text reading "How familiar are you with machine learning models? Please enter a number from 1-10, with 1 meaning least familiar (for example, you have little to no experience of any kind with machine learning) and 10 meaning most familiar (for example, you are an expert in the field of machine learning):". The determination of the user's familiarity may be based at least partly upon a response entered by the user (via, for example, one or more input devices such as a computer mouse, a keyboard, a touchscreen, etc.).

In some embodiments, user familiarity may be tracked via a persistent familiarity profile specific to the user. User identity may be tracked via one or more anonymized identifiers, such as, for example, a user account (accessed via username/password). In some embodiments, operation 106 may include determining whether a familiarity profile for the user exists already, such as by determining a user's identity and searching a database of familiarity profiles for a profile associated with the user's identity. If no familiarity profile can be found, the user may be assumed to be a first-time user or new user. In some embodiments, if the user is a first-time or otherwise new user, operation 106 may further include establishing an initial familiarity, such as by prompting and/or quizzing the user as described above. In some embodiments, if the user is a first-time or otherwise new user, operation 106 may include assuming a default familiarity level. In some embodiments, a user may be permitted to decline familiarity tracking, in which case operation 106 may include proceeding based on a default familiarity, a most recent familiarity, etc.

Method 100 further includes customizing the graph based on the user's familiarity at operation 108. In some embodiments, only some of the candidate ML models are to be depicted in the graph (such as to avoid clutter); thus, operation 108 may further include selecting a subset of the candidates to display. In some embodiments, operation 108 may further include selecting one or more candidates to "emphasize" (and/or one or more candidates to "deemphasize"). Selections may be based, for example, on score (higher-scoring candidates may be selected for emphasis and/or display), type (for example, selecting the highest-scoring candidate ML model of each type), hyperparameters (for example, selecting all candidates utilizing a particular hyperparameter), etc.

Selections may further be influenced by a user's familiarity level. For example, if the user's familiarity level is determined to be relatively low (suggesting that the user is a beginner or otherwise unfamiliar), operation 108 may include selecting fewer candidate ML models to display and/or emphasize.

Method 100 further includes presenting the graphical overview at operation 110. Operation 110 may include, for example, causing a display device to display the graphical overview based on the mapping generated at operation 104 and customized at operation 108. An example graphical overview is provided and described with reference to FIG. 2A. The graphical overview may depict the candidate ML models as well as their traits to enable a visual comparison.

The displayed graph may be based on selections made in operation 108, as will be understood by one of ordinary skill in the art. For example, a deemphasized candidate model may be depicted using relatively small icons and/or text, more muted colors (such as gray), etc. In contrast, an emphasized candidate model may be depicted with larger and/or bolder text and/or icons as well as different colors to distinguish the emphasized candidate from deemphasized candidates. For example, in a graph with several candidate models, the candidate model that is determined to be the most-likely best fit for a user may be presented with a large, opaque icon with a flashing red border, while a candidate model that is determined to be the least-likely best fit may be presented with a small, transparent, grey icon with no border.

Method 100 further includes determining whether clarification is necessary at operation 112. Operation 112 may include, for example, determining whether a user input (received via one or more input devices such as, for example, a mouse, a keyboard, a touchscreen, etc.) indicates that the user desires additional and/or different information than that presented in the graph. For example, a user may position a mouse cursor over an icon or keyword, which in some embodiments may indicate that the user desires elaboration regarding the icon or keyword. Other forms of input may indicate that clarification is necessary as well, such as a mouse click, a submitted query (for example, "what does SVM stand for?"), etc.

In some embodiments, user queries may be spoken. For example, operation 112 may further include detecting spoken user queries such as by, for example, monitoring input received via one or more microphones, performing one or more speech analysis methods (such as a speech-to-text algorithm) on the input and identifying a question based on the input.

If no clarification is necessary (112 "No"), method 100 may end at operation 118. If clarification is determined to be necessary or otherwise implicated (112 "Yes"), method 100 further includes responding to user queries at operation 114. If a specific user query including a question has been identified, operation 114 may include presenting a response based on the identified question. For example, during operation 112, a user may have been detected to have asked "what does SVM stand for?" In response, operation 114 may include responding to the query either via text (such as displaying text reading "Support Vector Machine"), via sound (such as by causing one or more audio output devices to audibly state "SVM stands for Support Vector Machine"), etc.

In some embodiments, if a user moused over the acronym "SVM" for a period of time greater than a predetermined threshold (for example, if a position of a mouse cursor is left on the word "SVM" for over 3 seconds), operation 114 may include displaying a window including additional text describing support vector machines. In some embodiments, operation 114 may include temporarily emphasizing a candidate model in response to user input.

Method 100 further includes revising the presentation of the graph at operation 116. Operation 116 may include modifying the display based on the user's input. For example, in some embodiments, if a user double-clicked on one model, operation 116 may include emphasizing the model and all nodes connected to it and/or deemphasizing all other models/nodes not connected to the selected model. In some embodiments, a user input may modify preferences regarding the presentation of the graph, such as changing one or more filters. Filters may control which models/nodes are displayed and/or emphasized according to various categories, such as scores, input types, model types, etc. Operation 116 may further include zooming in or out based on user input (such as through a pinch motion on a touchscreen, operation of a scroll wheel, etc.). Method 100 then ends at operation 118.

In some embodiments, a system performing method 100 may revise the familiarity level(s) of the user based on user input. For example, a familiarity level of the user may be updated based on the interactions and/or queries monitored via operation 112. In some embodiments, some interactions may be associated with a particular familiarity level, such that when a user is detected performing those interactions, a system may adjust the user's familiarity level "toward" the associated familiarity. As an example, clicking on or otherwise inquiring about an acronym may be associated with a relatively low familiarity. For example, if familiarity is tracked from 0 to 1, requesting an explanation of "SVM" may be assigned a familiarity of 0. Thus, if the user with a familiarity of 0.3 is detected to have requested an explanation of the acronym "SVM," the user's familiarity may be reduced (for example, from 0.3 to 0.2).

In some embodiments, a user's familiarity profile may be expanded. As an example, in some embodiments a user may initially have a simplified "overall" familiarity rating, but the user's interactions may result in more specific familiarity ratings. For example, a user may initially be an "intermediate" user. However, if the user is detected to request explanation of the acronym "SVM," rather than simply reduce the user's familiarity, a system may further add an additional field to the user's familiarity profile indicating that the user is a "beginner" in the context of SVM models. As various contexts are added over time, an "overall" familiarity level may be determined based on statistical analysis of the lower-level familiarity scores (for example, an arithmetic mean, weighted average, etc.).

Revising and/or updating the presentation of a graphical overview, such as by a process similar to operation 116, may be further based on the revised familiarity. For example, in some embodiments, a first graphical overview intended for an intermediate user may be replaced with a second graphical overview intended for an entry-level user. In some embodiments, if the user's updated familiarity profile indicates varying levels of familiarity in differing contexts (where the previous profile had more high-level, broadly generalized familiarity), portions of the graphical overview may be updated while others may be left unchanged. For example, if a previous familiarity profile merely indicated that the user was "intermediate," but a revised familiarity profile indicates that the user is "intermediate" in the context of convolutional neural networks but a "beginner" in the context of support vector machine models, then a depiction of an SVM model including a relatively detailed description may be replaced with a depiction including a broader, more simplified explanation, while a depiction of a CNN model may be left unchanged.

In general, a graphical overview consistent with the present disclosure may include a number of "nodes," connected by "edges." For example, a first machine learning model may be represented by a first node. If the first model has two inputs, they may be represented by a second and third node. The input nodes may be connected to the model node via lines, or edges. The model node may also be connected via edges to nodes representing hyperparameters that the model utilizes. Inputs and/or hyperparameters can be used by multiple models, represented by the input (and/or hyperparameter) nodes having an additional edge connecting them to each model, as appropriate. Thus, a graph of several models, some of which "share" inputs and/or hyperparameters, may take on an interconnected "web" appearance. Some or all of these nodes may also include information boxes providing basic (or, in some embodiments, more advanced) information about corresponding nodes. This layout enables an "at-a-glance" evaluation and comparison of different models.

Figure 2A:
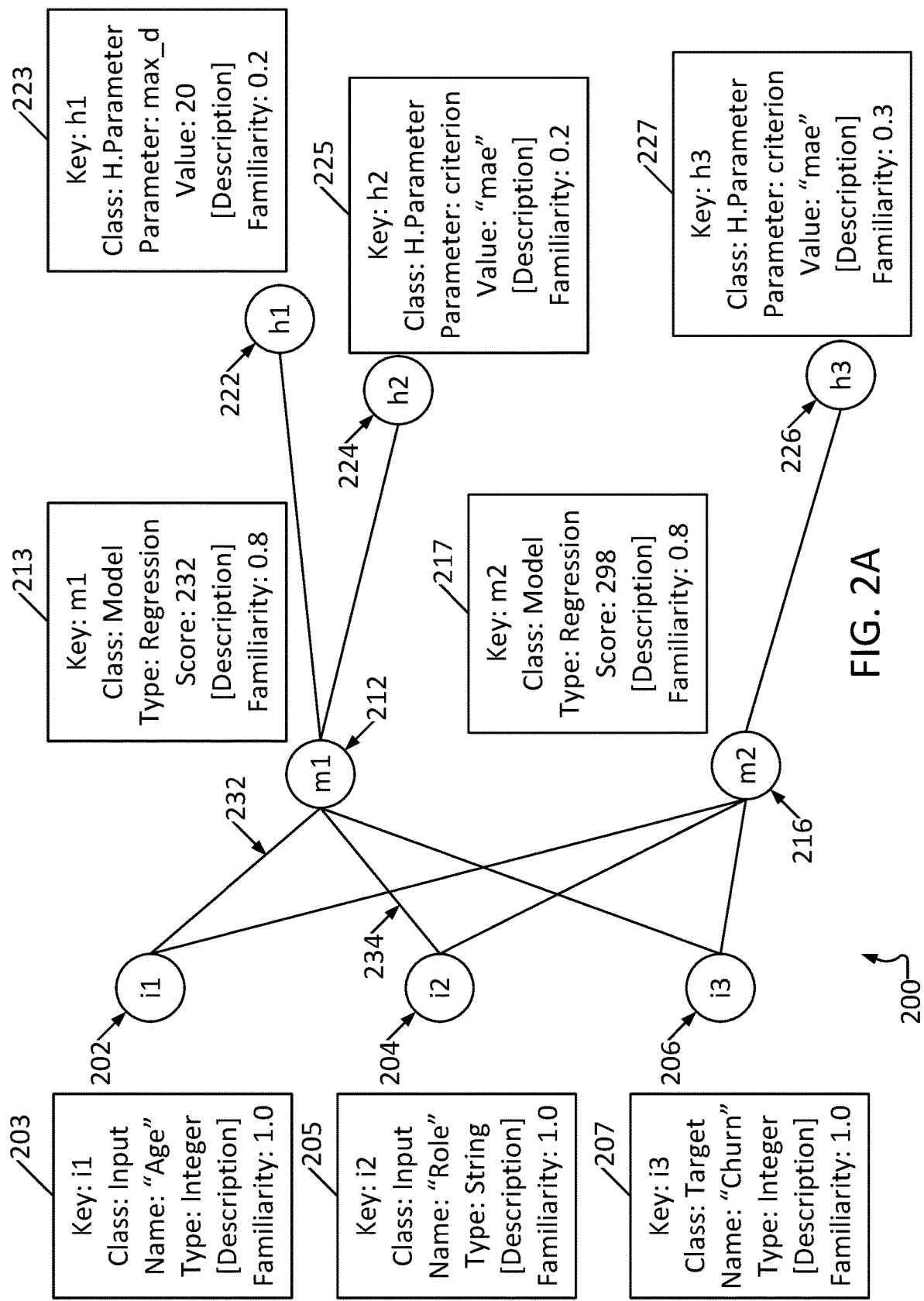
FIG. 2A illustrates an example machine learning model evaluation graph, consistent with several embodiments of the present disclosure.

FIG. 2A illustrates an example machine learning model evaluation graph 200, consistent with several embodiments of the present disclosure. Graph 200 includes a plurality of nodes, such as input nodes 202 and 204, target node 206, model nodes 212 and 216 and hyperparameter nodes 222, 224 and 226. Model nodes 212 and 216, as illustrated, are connected to their respective input nodes, target node, and hyperparameter nodes by edge lines. For example, as model m1 (node 212) utilizes inputs i1 (node 202) and i2 (node 204), graph 200 includes edge 232 (connecting node 202 to node 212) and edge 234 (connecting node 204 to node 212). Thus, a user is advantageously enabled to view which hyperparameters, inputs, and target a given model utilizes and/or relies upon.

Graph 200 further includes information boxes 203, 205, 207, 213, 217, 223, 225 and 227. Each information box of graph 200 corresponds to a node, and includes various data regarding the node. For example, information box 203 includes information regarding input i1 (node 202), such as the node's "key," what class of node i1 is (e.g., an input), a "name" of the input, what type of input i1 is, etc. Information box 203 may further include a description of the node, which may change depending upon a familiarity score. Descriptions of the nodes may vary based upon familiarity. For example, a relatively low familiarity score (either for a specific node or an overall familiarity score) may result in relatively more generalized and/or simplified description of the node, while a relatively higher score may result in additional detail, unexplained acronyms, etc.

In some embodiments, information box 203 may further display a familiarity score (from, for example, a familiarity profile of the user), although in some embodiments the familiarity score may be hidden from the user.

In example graph 200, information boxes for models such as box 213 for model m1 (node 212) may additionally include a score for the model. In some embodiments, the scores may be represented as their own nodes, as shown in FIG. 2B, below.

Information boxes 223, 225 and 227 may include information regarding hyperparameters h1 222, h2 224 and h3 226, respectively. For example, information box 223 may indicate a "parameter" of h1 (in FIG. 2A, the "Parameter" field of box 223 lists "max_d" which describes h1 as a "max depth") as well as a "value" of that parameter (in FIG. 2A, the "Value" field of box 223 is "20" which, in combination with the "Parameter" field, suggests that the max depth is 20).

Figure 2B:
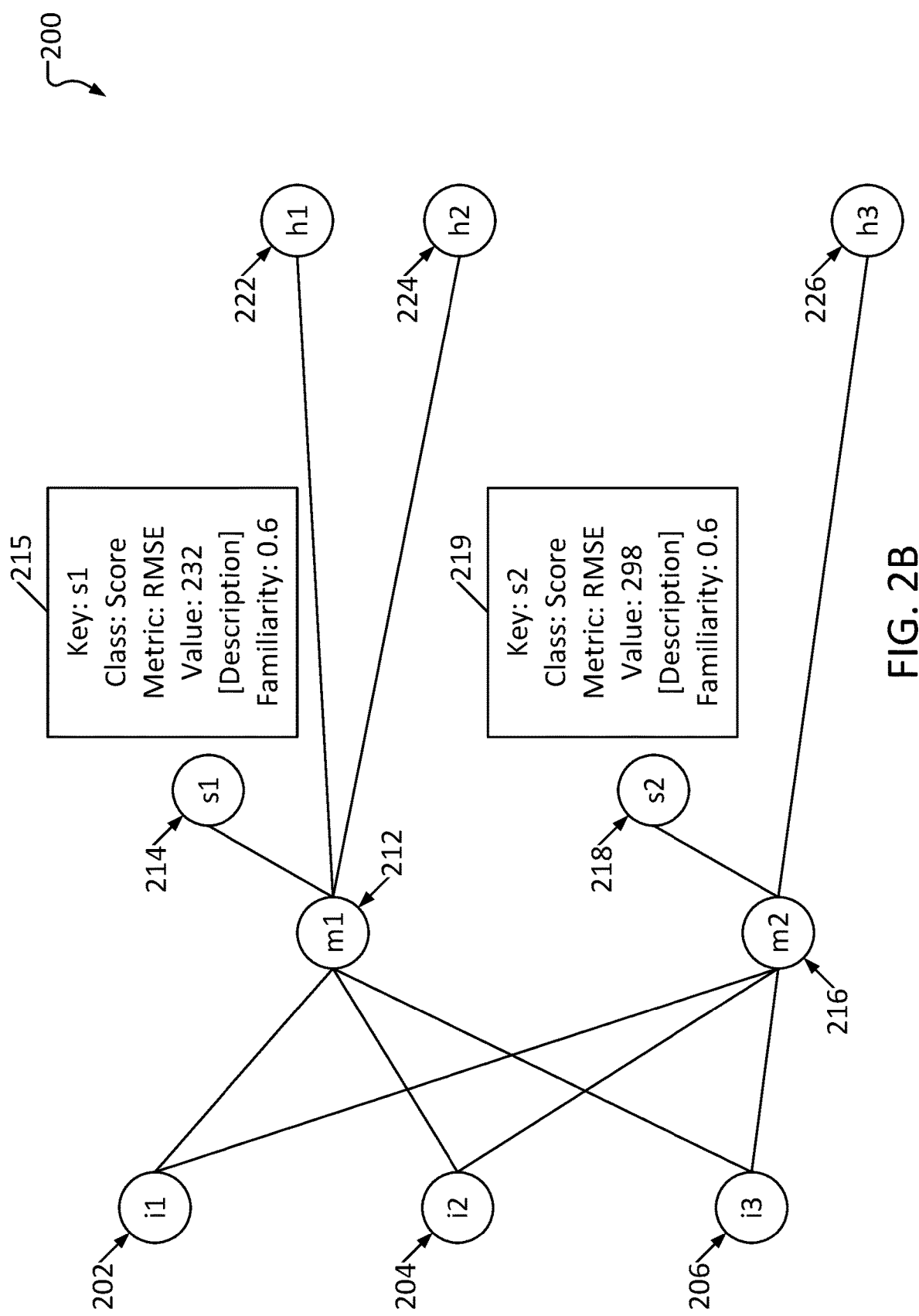
FIG. 2B illustrates another view of the example machine learning model evaluation graph of FIG. 2A depicting scores as separate nodes, consistent with several embodiments of the present disclosure.

FIG. 2B illustrates another view of example machine learning model evaluation graph 200 depicting scores as separate nodes, consistent with several embodiments of the present disclosure. As shown in FIG. 2B, graph 200 may instead depict scores s1 and s2 as nodes 214 and 218, respectively. Further, additional information boxes 215 and 219 may include information regarding scores s1 and s2, respectively, such as, for example, what metric the score represents, the specific value of the score, a description of the metric and/or value, etc.

As shown in FIG. 2B, information boxes 203, 205, 207, 213, 217, 223 and 225 may be hidden. For example, an information box may be hidden until a user interaction or submitted query inquires about a corresponding node. In some embodiments, some information boxes may be displayed while others are hidden. Selection of which information boxes to display may be based on, for example, node class (e.g., model nodes may always have information displayed, while input nodes may only have information displayed upon request), score of models connected to the node (e.g., information about every node connected to the highest-scoring model may be displayed by default), etc.

Figure 3:
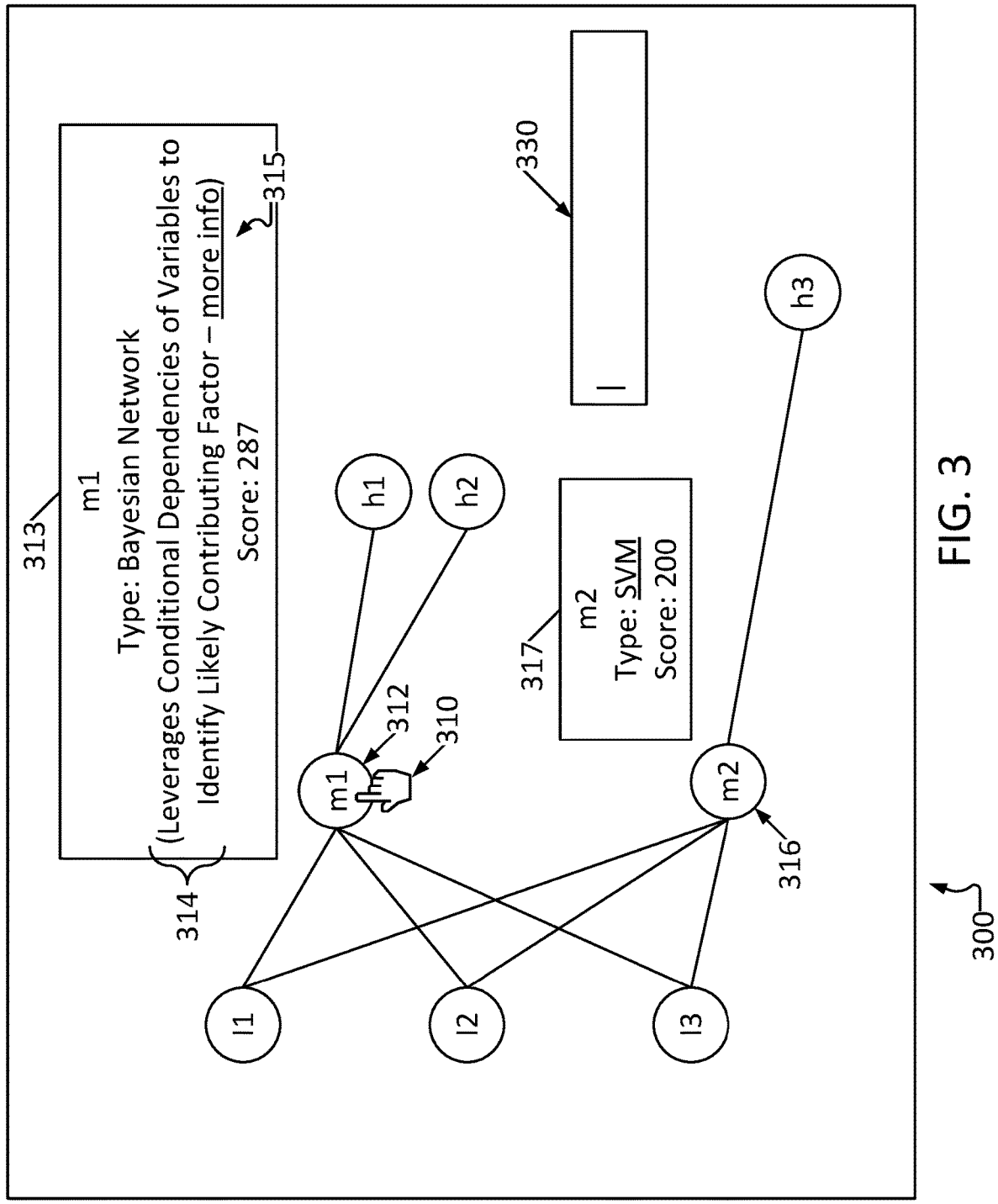
FIG. 3 illustrates an example chatbot interface presenting information based on familiarity and user interaction, according to several embodiments of the present disclosure.

FIG. 3 illustrates an example chatbot interface 300 presenting information based on familiarity and user interaction, according to several embodiments of the present disclosure. Interface 300 may be displayed on, for example, a computer monitor, touchscreen display, etc. Interface 300 includes a plurality of nodes such as, for example, nodes 312 and 316 corresponding to models m1 and m2. Interface 300 may also include displaying information boxes 313 and 317. As shown in FIG. 3, in some embodiments, some information boxes (such as box 317) may be in a "collapsed" or "compressed" state while other information boxes (such as information box 313) may be in an "expanded" state.

Interface 300 may change in response to user interactions, such as movements of a mouse cursor 310. As shown in FIG. 3, mouse cursor 310 being positioned over node 312 may result in node 312's corresponding information box 313 being expanded. In some embodiments, information box 313 may only be expanded upon a single- or double-click interaction (or "tap" in the case of a touchscreen interface, etc.). Expanded information box 313 may further include a more detailed description 314 describing corresponding model m1 of node 312. Detailed description 314 may additionally include a link 315 to enable a user to inquire for further information. Upon interaction with link 315, further information (not shown in FIG. 3) may be displayed. In addition, interface 300 may include a text field 330 to enable a user to submit text-based queries (via, for example, a keyboard).

Figure 4:
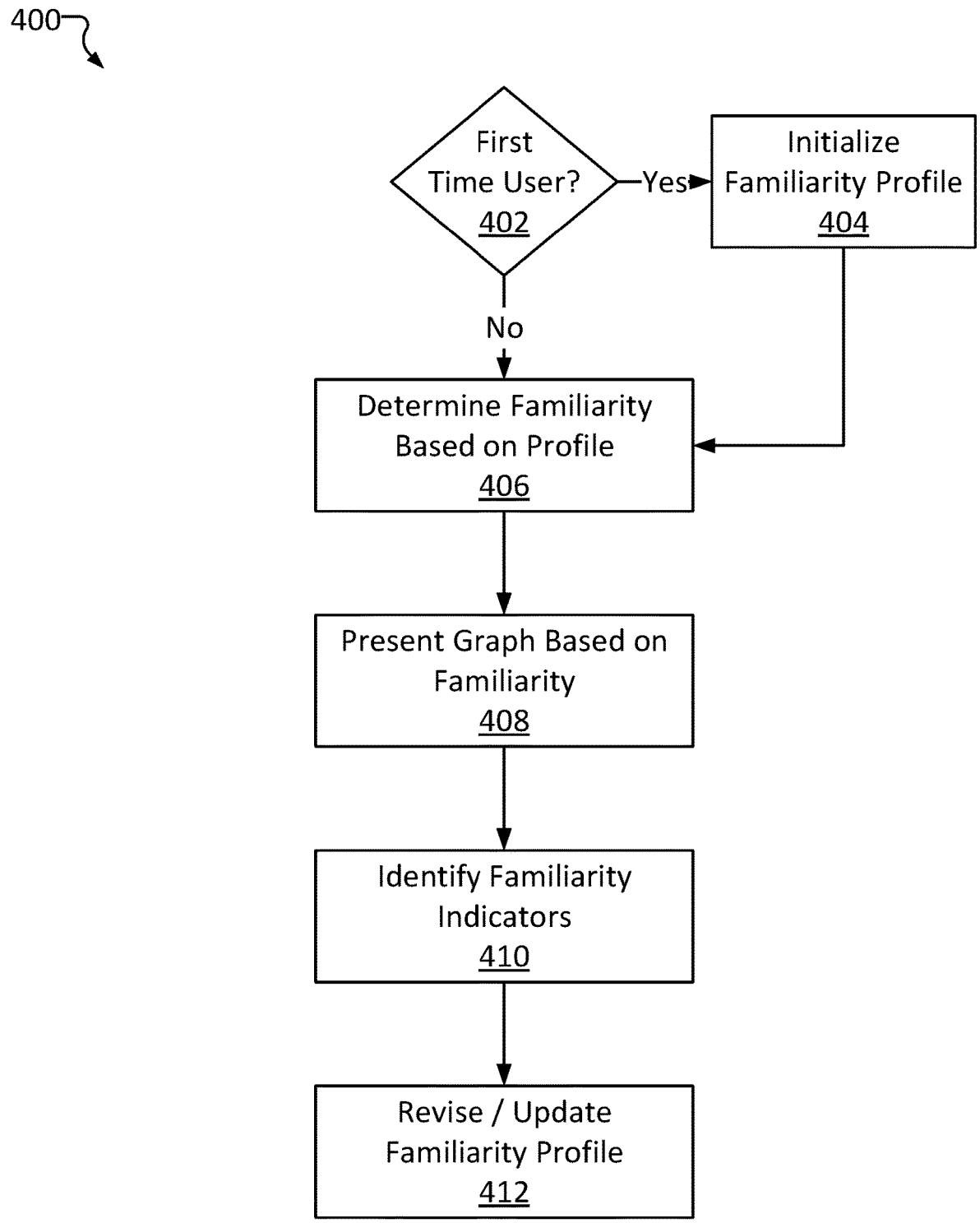
FIG. 4 illustrates a familiarity profile management method consistent with several embodiments of the present disclosure.

FIG. 4 illustrates a familiarity profile management method 400 consistent with several embodiments of the present disclosure. Method 400 includes determining whether a user is a first-time or otherwise "new" user at operation 402. Operation 402 may include, for example, searching (such as by scanning a database) for an existing familiarity profile associated with a user. This may be based on an anonymized identifier associated with the user, such as a username or logged-in account identifier.

If no familiarity profile is found or the user otherwise indicates that they are a "new" user (402 "Yes"), method 400 further includes initializing a familiarity profile at operation 404. Operation 404 may include, for example, creating a new profile. The new profile may be associated with a user identifier (such as a username etc.).

In some embodiments, a new familiarity profile may be initialized utilizing baseline or "default" values. In some embodiments, a new profile may be initialized via one or more user inputs; for example, a user may be presented with a prompt asking the user to enter their familiarity level. In some embodiments, the user may be presented with a "quiz" designed to assess their familiarity level with one or more machine learning topics.

In some embodiments, after a familiarity profile is initialized, the method may proceed to operation 406. However, in some embodiments, a user may be presented with the option to "opt-out" of having a familiarity profile, and, upon the user choosing such an option, operation 404 may include utilizing a "default" familiarity profile. In some embodiments, "default" profiles may not be updated, in which case method 400 may proceed directly to operation 408 to present the graph, skipping operations 406 and 410-412.

If the user is not a new user (402 "No," such as if an existing familiarity profile associated with the user is located), method 400 proceeds from operation 402 to operation 406. Operation 406 includes determining a familiarity of the user based on the familiarity profile at operation 406. Operation 406 may include reading one or more values stored in the familiarity profile. Note that, if the user was a new user (402 "Yes"), operation 406 may include simply reading the profile that was just initialized via operation 404.

Method 400 further includes presenting a graph based on the determined familiarity at operation 408. Operation 408 may include, for example, customizing and presenting a graphical overview of one or more machine learning models, with descriptions and/or the layout of the graph being adjusted based on the determined familiarity.

Method 400 further includes identifying one or more familiarity indicators at operation 410. Familiarity indicators, as used herein, refer to events that may have bearing on a user's familiarity with a given topic. Example familiarity indicators include clarifying questions, queries that suggest a particular level of familiarity (high, low, or in between), etc. For example, operation 410 may include detecting that a user has requested clarification of an acronym. This may suggest a relatively low level of familiarity with a topic including the acronym.

Method 400 further includes revising and/or updating the familiarity profile at operation 412. Operation 412 may include, for example, writing a new value to the stored familiarity profile based at least on the identified familiarity indicator(s). In particular, operation 412 may include adjusting a familiarity level "toward" that indicated by user interactions and/or queries.

In some embodiments, operation 412 may include determining whether a higher-resolution familiarity profile is possible and, if so, adding and populating one or more familiarity categories. For example, if a profile initially simply indicates that a user's familiarity is "intermediate" but operation 410 identified that a user has a "beginner"-level familiarity with a specific topic, operation 412 may include creating an entry in the familiarity profile associated with that specific topic and identifying that the user has a "low" level of familiarity with that topic.

In some embodiments, adding categories may further include adjusting the "overall" familiarity level; for example, in some embodiments, if a user previously had a familiarity of 0.5 (which may signify an "intermediate" familiarity level) with 3 different topics, and a fourth topic is added with which the user has a low familiarity of 0.1, an "overall" familiarity may be adjusted from 0.5 to 0.4. In this example, overall familiarity may simply be an average of all "lower-level" familiarities. However, in some embodiments, different topics may have different "weights" or "biases" implying that their associated familiarity level may have a disproportionate impact on "overall" familiarity.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
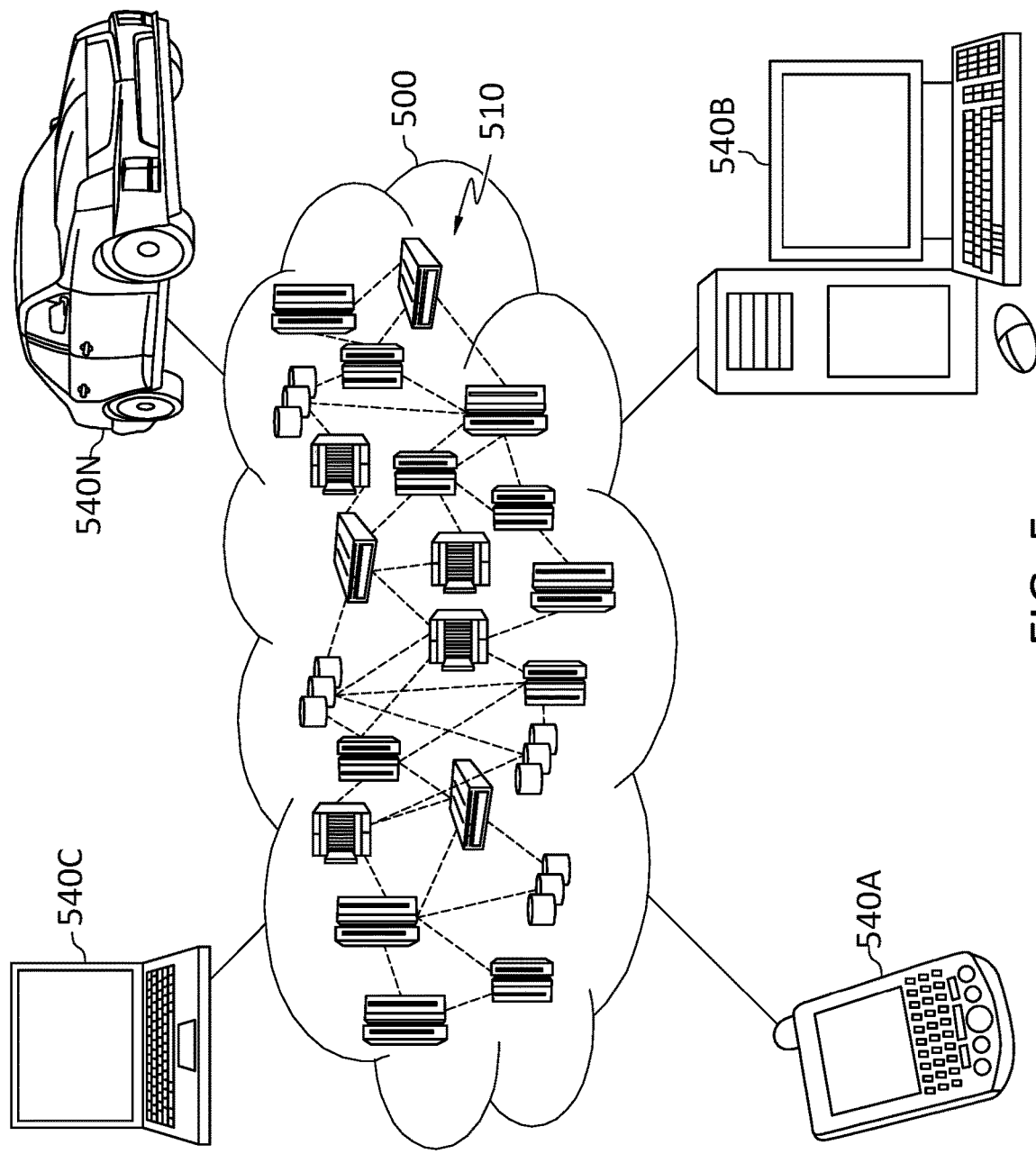
FIG. 5 depicts a cloud computing environment according to an embodiment of the present disclosure.

Referring now to FIG. 5, illustrative cloud computing environment 500 is depicted. As shown, cloud computing environment 500 comprises one or more cloud computing nodes 510 with which local computing devices used by cloud consumers, such as, for example, personal digital assistant (PDA) or cellular telephone 540A, desktop computer 540B, laptop computer 540C, and/or automobile computer system 540N may communicate. Nodes 510 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 540A-N shown in FIG. 5 are intended to be illustrative only and that computing nodes 510 and cloud computing environment 500 can communicate with any type of computerized device over any type of network and/or network addressable connection (e.g., using a web browser).

Figure 6:
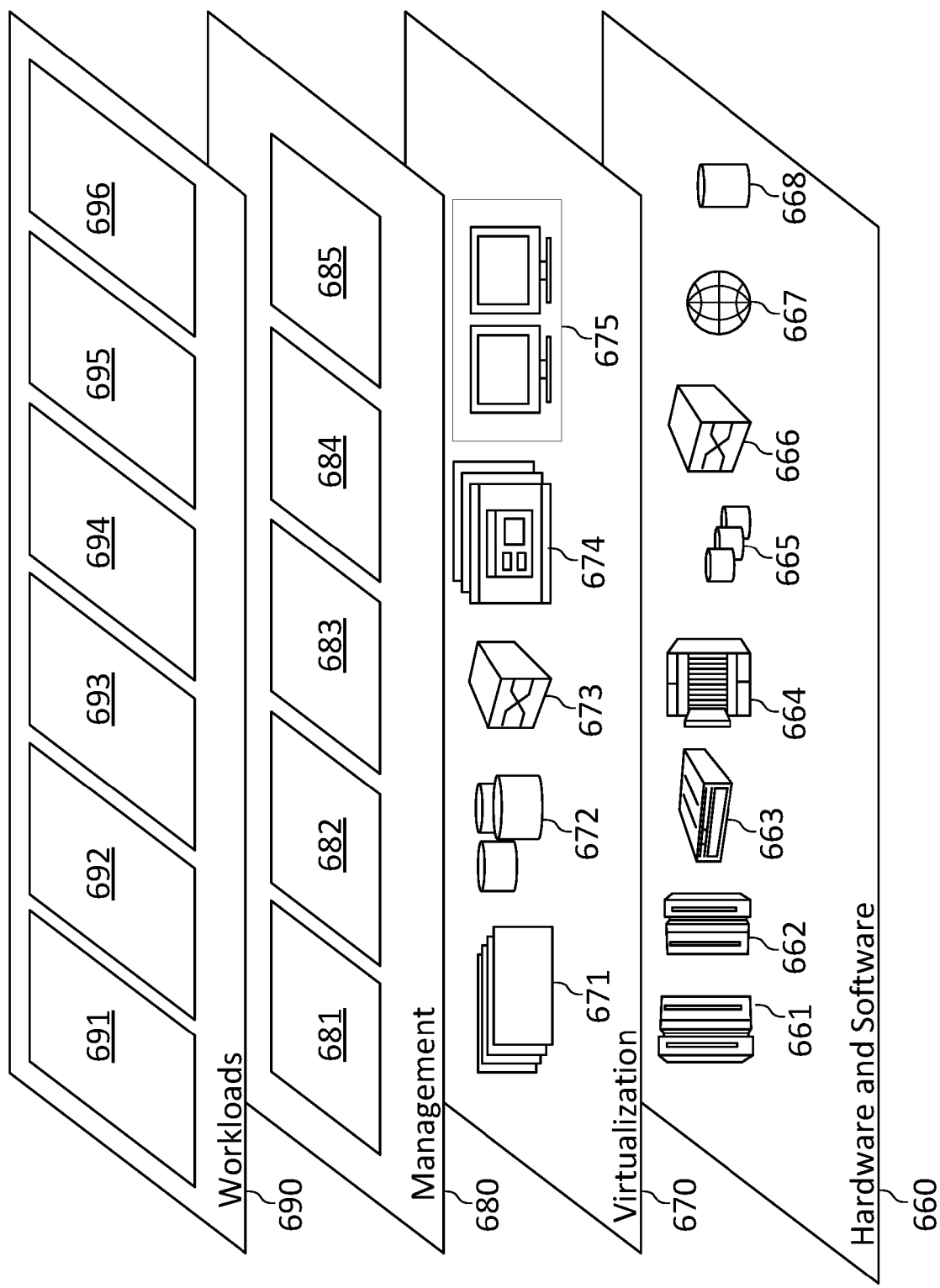
FIG. 6 depicts abstraction model layers according to an embodiment of the present disclosure.

Referring now to FIG. 6, a set of functional abstraction layers provided by cloud computing environment 500 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 660 includes hardware and software components. Examples of hardware components include: mainframes 661; RISC (Reduced Instruction Set Computer) architecture based servers 662; servers 663; blade servers 664; storage devices 665; and networks and networking components 666. In some embodiments, software components include network application server software 667 and database software 668.

Virtualization layer 670 provides an abstraction layer from which the following examples of virtual entities may be provided: virtual servers 671; virtual storage 672; virtual networks 673, including virtual private networks; virtual applications and operating systems 674; and virtual clients 675.

In one example, management layer 680 may provide the functions described below. Resource provisioning 681 provides dynamic procurement of computing resources and other resources that are utilized to perform tasks within the cloud computing environment. Metering and Pricing 682 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 683 provides access to the cloud computing environment for consumers and system administrators. Service level management 684 provides cloud computing resource allocation and management such that required service levels are met. Service Level Agreement (SLA) planning and fulfillment 685 provide pre-arrangement for, and procurement of, cloud computing resources for which a future requirement is anticipated in accordance with an SLA.

Workloads layer 690 provides examples of functionality for which the cloud computing environment may be utilized. Examples of workloads and functions which may be provided from this layer include: mapping and navigation 691; software development and lifecycle management 692; virtual classroom education delivery 693; data analytics processing 694; transaction processing 695; and familiarity-based machine learning model graph generation 696.

Figure 7:
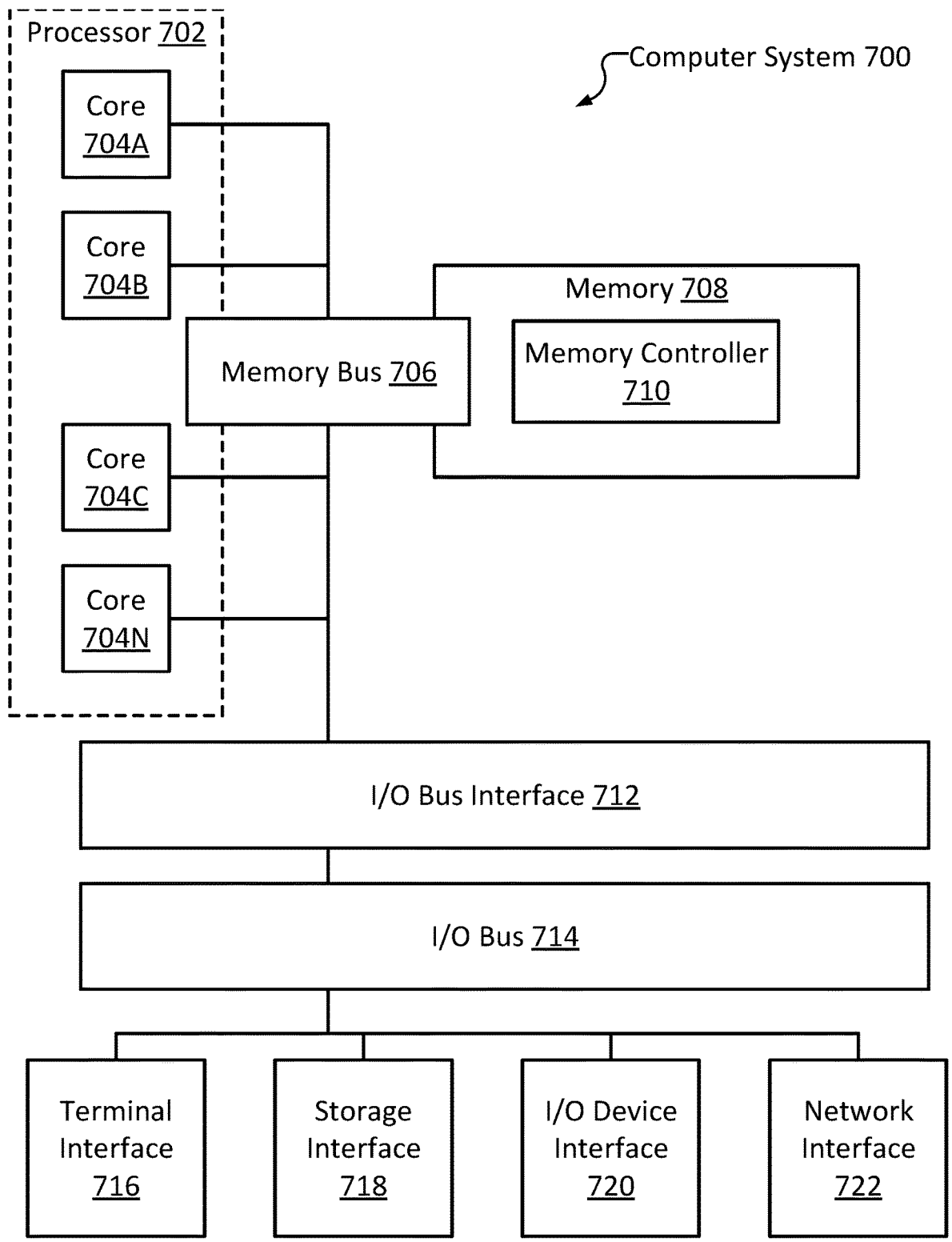
FIG. 7 illustrates a high-level block diagram of an example computer system that may be used in implementing embodiments of the present disclosure.

Referring now to FIG. 7, shown is a high-level block diagram of an example computer system 700 that may be configured to perform various aspects of the present disclosure, including, for example, methods 100 and 400. The example computer system 700 may be used in implementing one or more of the methods or modules, and any related functions or operations, described herein (e.g., using one or more processor circuits or computer processors of the computer), in accordance with embodiments of the present disclosure. In some embodiments, the major components of the computer system 700 may comprise one or more CPUs 702, a memory subsystem 708, a terminal interface 716, a storage interface 718, an I/O (Input/Output) device interface 720, and a network interface 722, all of which may be communicatively coupled, directly or indirectly, for inter-component communication via a memory bus 706, an I/O bus 714, and an I/O bus interface unit 712.

The computer system 700 may contain one or more general-purpose programmable central processing units (CPUs) 702, some or all of which may include one or more cores 704A, 704B, 704C, and 704D, herein generically referred to as the CPU 702. In some embodiments, the computer system 700 may contain multiple processors typical of a relatively large system; however, in other embodiments the computer system 700 may alternatively be a single CPU system. Each CPU 702 may execute instructions stored in the memory subsystem 708 on a CPU core 704 and may comprise one or more levels of on-board cache.

In some embodiments, the memory subsystem 708 may comprise a random-access semiconductor memory, storage device, or storage medium (either volatile or non-volatile) for storing data and programs. In some embodiments, the memory subsystem 708 may represent the entire virtual memory of the computer system 700 and may also include the virtual memory of other computer systems coupled to the computer system 700 or connected via a network. The memory subsystem 708 may be conceptually a single monolithic entity, but, in some embodiments, the memory subsystem 708 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. In some embodiments, the main memory or memory subsystem 804 may contain elements for control and flow of memory used by the CPU 702. This may include a memory controller 710.

Although the memory bus 706 is shown in FIG. 7 as a single bus structure providing a direct communication path among the CPU 702, the memory subsystem 708, and the I/O bus interface 712, the memory bus 706 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 712 and the I/O bus 714 are shown as single respective units, the computer system 700 may, in some embodiments, contain multiple I/O bus interface units 712, multiple I/O buses 714, or both. Further, while multiple I/O interface units are shown, which separate the I/O bus 714 from various communications paths running to the various I/O devices, in other embodiments some or all of the I/O devices may be connected directly to one or more system I/O buses.

In some embodiments, the computer system 700 may be a multi-user mainframe computer system, a single-user system, or a server computer or similar device that has little or no direct user interface but receives requests from other computer systems (clients). Further, in some embodiments, the computer system 700 may be implemented as a desktop computer, portable computer, laptop or notebook computer, tablet computer, pocket computer, telephone, smart phone, mobile device, or any other appropriate type of electronic device.

It is noted that FIG. 7 is intended to depict the representative major components of an exemplary computer system 700. In some embodiments, however, individual components may have greater or lesser complexity than as represented in FIG. 7, components other than or in addition to those shown in FIG. 7 may be present, and the number, type, and configuration of such components may vary.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method, comprising:
creating a graphical overview of M machine learning models, wherein M is at least 2;
determining a familiarity level of a user, wherein the familiarity level of a user is a level of the user's technical knowledge of machine learning models;
customizing the graphical overview based on the familiarity level; an
displaying the graphical overview, wherein said displaying the graphical overview comprises displaying N nodes and multiple edges, wherein N is greater than 2, wherein each edge is a line connecting only two nodes of the N nodes, wherein the N nodes comprise M model nodes, one or more input nodes, and one or more hyperparameter nodes, wherein each model node represents a unique model of the M models, wherein each model node is connected to at least one input node by a unique edge of the multiple edges, wherein each model node is connected to at least one hyperparameter node by one unique edge of the multiple edges, wherein each input node represents one or more inputs to each model node connected to said each input node, and wherein each hyperparameter node represents one or more hyperparameters used by each model node connected to said each input node.

2. The method of claim 1, further comprising:
detecting a user input;
determining, based on the user input, that a graph clarification is implicated; and updating the graphical overview based on the graph clarification.

3. The method of claim 2, further comprising updating, based on the input, the familiarity level of the user.

4. The method of claim 1, further comprising:
determining that a storage device does not include a familiarity profile associated with the user; and
creating, responsive to the determining, a new familiarity profile associated with the user,
the creating including:
prompting a user to input familiarity information;
receiving a response to the prompting;
determining an initial familiarity level based on the response; and
storing the initial familiarity level in the new familiarity profile, wherein the determining the familiarity level of the user is based on the new familiarity profile.

5. The method of claim 1, further comprising determining that a storage device includes a familiarity profile associated with the user, wherein the determining the familiarity level of the user is based on the familiarity profile.

6. A system comprising: a memory; and a central processing unit (CPU) including one or more CPU cores configured to:
create a graphical overview of M machine learning models, wherein M is at least 2;
determine a familiarity level of a user, wherein the familiarity level of a user is a level of the user's technical knowledge of machine learning models;
customize the graphical overview based on the familiarity level; and
display the graphical overview, wherein said displaying the graphical overview comprises displaying N nodes and multiple edges, wherein N is greater than 2, wherein each edge is a line connecting only two nodes of the N nodes, wherein the N nodes comprise M model nodes, one or more input nodes, and one or more hyperparameter nodes, wherein each model node represents a unique model of the M models, wherein each model node is connected to at least one input node by a unique edge of the multiple edges, wherein each model node is connected to at least one hyperparameter node by one unique edge of the multiple edges, wherein each input node represents one or more inputs to each model node connected to said each input node, and wherein each hyperparameter node represents one or more hyperparameters used by each model node connected to said each input node.

7. The system of claim 6, wherein the CPU is further configured to:
detect a user input;
determine, based on the user input, that a graph clarification is implicated; and
update the graphical overview based on the graph clarification.

8. The system of claim 7, wherein the CPU is further configured to update, based on the input, the familiarity level of the user.

9. The system of claim 6, wherein the CPU is further configured to:
determine that a storage device does not include a familiarity profile associated with the user; and
create, responsive to the determining, a new familiarity profile associated with the user,
the creating including:
prompting a user to input familiarity information;
receiving a response to the prompting;
determining an initial familiarity level based on the response; and
storing the initial familiarity level in the new familiarity profile, wherein the determining the familiarity level of the user is based on the new familiarity profile.

10. The system of claim 6, wherein the CPU is further configured to determine that a storage device includes a familiarity profile associated with the user, wherein the determining the familiarity level of the user is based on the familiarity profile.

11. A computer program product, the computer program product comprising a computer readable storage medium having program instructions embodied therewith, the program instructions executable by a computer to cause the computer to:
create a graphical overview of M machine learning models, wherein M is at least 2;
determine a familiarity level of a user, wherein the familiarity level of a user is a level of the user's technical knowledge of machine learning models;
customize the graphical overview based on the familiarity level; and
display the graphical overview, wherein said displaying the graphical overview comprises displaying N nodes and multiple edges, wherein N is greater than 2, wherein each edge is a line connecting only two nodes of the N nodes, wherein the N nodes comprise M model nodes, one or more input nodes, and one or more hyperparameter nodes, wherein each model node represents a unique model of the M models, wherein each model node is connected to at least one input node by a unique edge of the multiple edges, wherein each model node is connected to at least one hyperparameter node by one unique edge of the multiple edges, wherein each input node represents one or more inputs to each model node connected to said each input node, and wherein each hyperparameter node represents one or more hyperparameters used by each model node connected to said each input node.

12. The computer program product of claim 11, wherein the instructions further cause the computer to:
detect a user input;
determine, based on the user input, that a graph clarification is implicated; and
update the graphical overview based on the graph clarification.

13. The computer program product of claim 12, wherein the instructions further cause the computer to update, based on the input, the familiarity level of the user.

14. The computer program product of claim 11, wherein the instructions further cause the computer to:
determine that a storage device does not include a familiarity profile associated with the user; and
create, responsive to the determining, a new familiarity profile associated with the user,
the creating including:
prompting a user to input familiarity information;
receiving a response to the prompting;
determining an initial familiarity level based on the response; and
storing the initial familiarity level in the new familiarity profile, wherein the determining the familiarity level of the user is based on the new familiarity profile.

15. The method of claim 1, wherein said displaying the graphical overview further comprises displaying N information boxes, and wherein each information box includes information about a respective node of the N nodes and is not physically connected to the respective node.

16. The system of claim 6, wherein said display of the graphical overview further comprises display of N information boxes, and wherein each information box includes information about a respective node of the N nodes and is not physically connected to the respective node.

17. The computer program product of claim 11, wherein said display of the graphical overview further comprises display of N information boxes, and wherein each information box includes information about a respective node of the N nodes and is not physically connected to the respective node.

18. The method of claim 1, wherein the N nodes further comprise M score nodes, wherein each score node is connected to a unique model node of the M model nodes by one of the edges, and wherein each score node specifies a numerical score for the unique model node and a metric that the numerical score represents.

19. The system of claim 6, wherein the N nodes further comprise M score nodes, wherein each score node is connected to a unique model node of the M model nodes by one of the edges, and wherein each score node specifies a numerical score for the unique model node and a metric that the numerical score represents.

20. The computer program product of claim 11, wherein the N nodes further comprise M score nodes, wherein each score node is connected to a unique model node of the M model nodes by one of the edges, and wherein each score node specifies a numerical score for the unique model node and a metric that the numerical score represents.

\* \* \* \* \*